US012342113B2

(12) United States Patent
Davis et al.

(10) Patent No.: US 12,342,113 B2
(45) Date of Patent: Jun. 24, 2025

(54) MICROPHONE APPARATUS

(71) Applicant: Nokia Technologies Oy, Espoo (FI)

(72) Inventors: Ian Davis, Wicklow (IE); Oliver Burns, Oldcastle (IE); Diarmuid O'Connell, Athy (IE); Akshat Agarwal, Clonmagaddan (IE); Nicholas Jeffers, Wicklow (IE)

(73) Assignee: Nokia Technologies Oy, Espoo (FI)

( * ) Notice: Subject to any disclaimer, the term of this patent is extended or adjusted under 35 U.S.C. 154(b) by 230 days.

(21) Appl. No.: 18/023,525

(22) PCT Filed: Aug. 6, 2021

(86) PCT No.: PCT/EP2021/072045
§ 371 (c)(1),
(2) Date: Feb. 27, 2023

(87) PCT Pub. No.: WO2022/043029
PCT Pub. Date: Mar. 3, 2022

(65) Prior Publication Data

US 2023/0328415 A1 Oct. 12, 2023

(30) Foreign Application Priority Data

Aug. 27, 2020 (GB) .................................... 2013450

(51) Int. Cl.

| | |
|---|---|
| ***H04R 1/08*** | (2006.01) |
| ***H04R 1/02*** | (2006.01) |
| ***H04R 1/22*** | (2006.01) |

(52) U.S. Cl.
CPC ................ *H04R 1/02* (2013.01); *H04R 1/08* (2013.01); *H04R 1/222* (2013.01); *H04R 2201/029* (2013.01); *H04R 2499/11* (2013.01)

(58) Field of Classification Search
CPC . H04R 1/02; H04R 1/08; H04R 1/222; H04R 2201/029; H04R 2499/11; H04R 1/2815; H04R 1/245; H04R 2499/15; H04R 21/02
See application file for complete search history.

(56) References Cited

U.S. PATENT DOCUMENTS

| | | | |
|---|---|---|---|
| 1,854,474 | A | 4/1932 | Lane |
| 2016/0033793 | A1 | 2/2016 | Fenton et al. |

OTHER PUBLICATIONS

Boland, C.S. et al., "Sensitive Electromechanical Sensors Using Viscoelastic Graphene-Polymer Nanocomposites," Science, vol. 354, No. 6317, Dec. 9, 2016, pp. 1257-1260.

*Primary Examiner* — Tuan D Nguyen
(74) *Attorney, Agent, or Firm* — McCarter & English, LLP

(57) ABSTRACT

A microphone apparatus including: a casing; a composite material located within the casing, the composite material including at least in part conductive particles, the composite material configured to alter an internal impedance based on a surface disturbance transmitted by an acoustic wave, and wherein the microphone apparatus is configured to be coupled to a surface that transmitted the acoustic wave.

20 Claims, 9 Drawing Sheets

401

501

MICROPHONE APPARATUS

CROSS REFERENCE TO RELATED APPLICATION

This patent application is a U.S. National Stage application of International Patent Application Number PCT/EP2021/072045 filed Aug. 6, 2021, which is hereby incorporated by reference in its entirety, and claims priority to GB 2013450.8 filed Aug. 27, 2020.

FIELD

The present application relates to apparatus and methods for audio recording and capture, but not exclusively for audio recording and capture within a holeless mobile phone.

BACKGROUND

Mobile devices, such as mobile phones, are being designed with as few as openings as possible to improve the devices reliability as the phone would be less effected by water or other foreign material (dust, metallic particles etc) ingress.

Furthermore, industrial designers aim to make the mobile device designs as sleek as possible, but holes are a barrier to this goal. Additionally the fewer number of openings on a panel increases the possible screen-to-body ratio as there is no cut-out required, and furthermore improve the devices strength as each hole may be a weak point from which cracks may form and radiate from.

Improvements such as sealed batteries, e-sims and wireless charging have reduced the number of openings which are required for such devices. However one function which currently requires at least one opening to function well is audio recording. The state of the art component used for audio recording is an electret condenser type microphone implemented within a micro-electromechanical system (MEMS) transducer. The MEMS transducer significantly reduces volume, for example typical MEMS microphones have sizes in the approximate range 4 mm×2 mm×1.5 mm. However such transducers require acoustic holes between the exterior of the device to the transducer in order to expose the transducer membrane to the impinging sound waves. The sound waves travel through these acoustic holes and bend the membrane or conductive plate which results in a measurable change in voltage. Thus a mobile device will be equipped with ports/holes in their shell so that the microphone is exposed to the surrounding air to make audio recordings.

Reducing the number and dimensions of the holes in an implementation employing traditional microphones and loudspeakers reduces the airflow path between the transducer and the surrounding environments and increases transmission losses which leads to low signal to noise ratio (SNR) microphone recordings and distorted audio playback.

SUMMARY

There is provided according to a first aspect an a microphone apparatus comprising: a casing; a composite material located within the casing, the composite material comprising at least in part conductive particles, the composite material configured to alter an internal impedance based on a surface disturbance transmitted by an acoustic wave, and wherein the microphone apparatus is configured to be coupled to a surface that transmitted the acoustic wave.

The casing may be configured to form an air gap underlying the composite material, the air gap configured to acoustically tune the microphone apparatus.

The microphone apparatus may further comprise a cover located over at least one open face of the casing and in contact with the composite material and the interior side of a further apparatus.

The cover may comprise a membrane layer overlying the composite material.

The cover may be configured to mechanically protect the composite material.

The cover may be configured to provide acoustic wave impedance matching.

The casing may be configured to surround and support the composite material.

The casing may comprise a hole configured to acoustically tune the microphone apparatus.

The microphone apparatus may further comprise at least one pair of electrodes coupled to the composite material, wherein the at least one pair of electrodes may be configured to enable the internal impedance to be determined.

The composite material may comprise at least two elements arranged in a defined configuration, wherein the at least two elements may comprise an associated internal impedance.

The conductive particles may comprise at least one of: graphene; silver; and copper.

The composite material may further comprise a viscoelastic polymer.

The composite material may have a relative change in impedance for a defined strain change value in the range 500 to 700.

A mobile device may comprise: at least one microphone apparatus as discussed herein; at least one further apparatus comprising a casing on which the at least one microphone apparatus is coupled to the interior side thereof; and at least one audio signal generator configured to determine an audio signal based on the internal impedance.

The mobile device may further comprise at least one inertial measurement sensor or vibration sensor configured to determine at least one vibration internal to the mobile device, wherein the at least one audio signal generator may be further configured to determine the audio signal based on the at least one vibration internal to the mobile device.

The at least one audio signal generator may be further configured to determine the audio signal based on a processing of a first internal impedance associated with a first of the at least two elements and a second internal impedance associated with a second of the at least two elements, such that the processing is configured to selectively beamform the audio signal.

The at least one microphone apparatus may comprise two or more physically separate microphone apparatus, wherein the at least one audio signal generator may be further configured to determine the audio signal based on a selection or processing of the internal impedance associated with a first of the two or more physically separate microphone apparatus and the internal impedance associated with a second of the two or more physically separate microphone apparatus.

The further apparatus casing on which the at least one microphone apparatus is coupled to the interior side thereof may be a display or display assembly.

According to a second aspect there is provided a method for a microphone apparatus, the method comprising: providing a casing; providing a composite material located within the casing, the composite material comprising at least in part conductive particles, the composite material configured to alter an internal impedance based on a surface disturbance transmitted by an acoustic wave, and wherein the microphone apparatus is configured to be coupled to a surface that transmitted the acoustic wave.

The method for a microphone apparatus further comprising providing an air gap underlying the composite material within the casing, the air gap configured to acoustically tune the microphone apparatus.

The method for a microphone apparatus further comprising providing a cover located over at least one open face of the casing and in contact with the composite material and the interior side of a further apparatus.

The method for a microphone apparatus, wherein providing the cover comprises providing a membrane layer overlying the composite material.

The method for a microphone apparatus, wherein providing the cover comprises mechanically protecting the composite material.

The method for a microphone apparatus, wherein providing the cover comprises acoustic wave impedance matching.

The method for a microphone apparatus, wherein providing the cover comprises surrounding and supporting the composite material.

The method for a microphone apparatus, wherein providing the casing comprises providing a casing with a hole configured to acoustically tune the microphone apparatus.

The method for a microphone apparatus, further comprising providing at least one pair of electrodes coupled to the composite material, wherein the at least one pair of electrodes are configured to enable the internal impedance to be determined.

The method for a microphone apparatus, wherein providing the composite material located within the casing may comprise providing at least two elements arranged in a defined configuration, wherein the at least two elements comprise an associated internal impedance.

The conductive particles may comprise at least one of: graphene; silver; and copper.

The composite material may further comprise a viscoelastic polymer.

The composite material may comprise a relative change in impedance for a defined strain change value in the range 500 to 700.

A method for a mobile device comprising: providing the least one microphone apparatus as discussed herein; and providing at least one further apparatus comprising a casing on which the at least one microphone apparatus is coupled to the interior side thereof; and providing at least one audio signal generator configured to determine an audio signal based on the internal impedance.

The method for a mobile device may comprise: providing at least one inertial measurement sensor or vibration sensor configured to determine at least one vibration internal to the mobile device; and determining the audio signal based on the at least one vibration internal to the mobile device.

Determining the audio signal based on the at least one vibration internal to the mobile device may comprise determining the audio signal based on a processing of a first internal impedance associated with a first of the at least two elements and a second internal impedance associated with a second of the at least two elements, such that the determining selectively beamforms the audio signal.

Providing the least one microphone apparatus as discussed herein may comprise providing two or more physically separate microphone apparatus.

Determining the audio signal may further comprise determining the audio signal based on a selection or processing of the internal impedance associated with a first of the two or more physically separate microphone apparatus and the internal impedance associated with a second of the two or more physically separate microphone apparatus.

According to a third aspect there is provided a microphone apparatus comprising: a casing means; a composite material means located within the casing, the composite material means comprising at least in part conductive particles, the composite material means configured to alter an internal impedance based on a surface disturbance transmitted by an acoustic wave, and wherein the microphone apparatus is configured to be coupled to a surface that transmitted the acoustic wave.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

As discussed above one of the challenges that arises from a holeless device design is that traditional microphones and loudspeakers will be ineffective as they lack an airflow path between the transducer and the surrounding environments, so transmission losses will be extremely high.

The concept as discussed in the embodiments hereafter is therefore a microphone suitable for implementation within a device which does not require an airflow path between the transducer and the surrounding environment. The microphones as discussed in the embodiments herein thus implement a sensor design which can be coupled or connected to an interior surface of the mobile device cover (such as the back side of a mobile phone display glass) to detect acoustic pressures with high sensitivities.

The embodiments as discussed herein are particularly beneficial in devices such as holeless phones as it allows audio recordings to be made without an air transmission path to the sensor.

Figure 1:
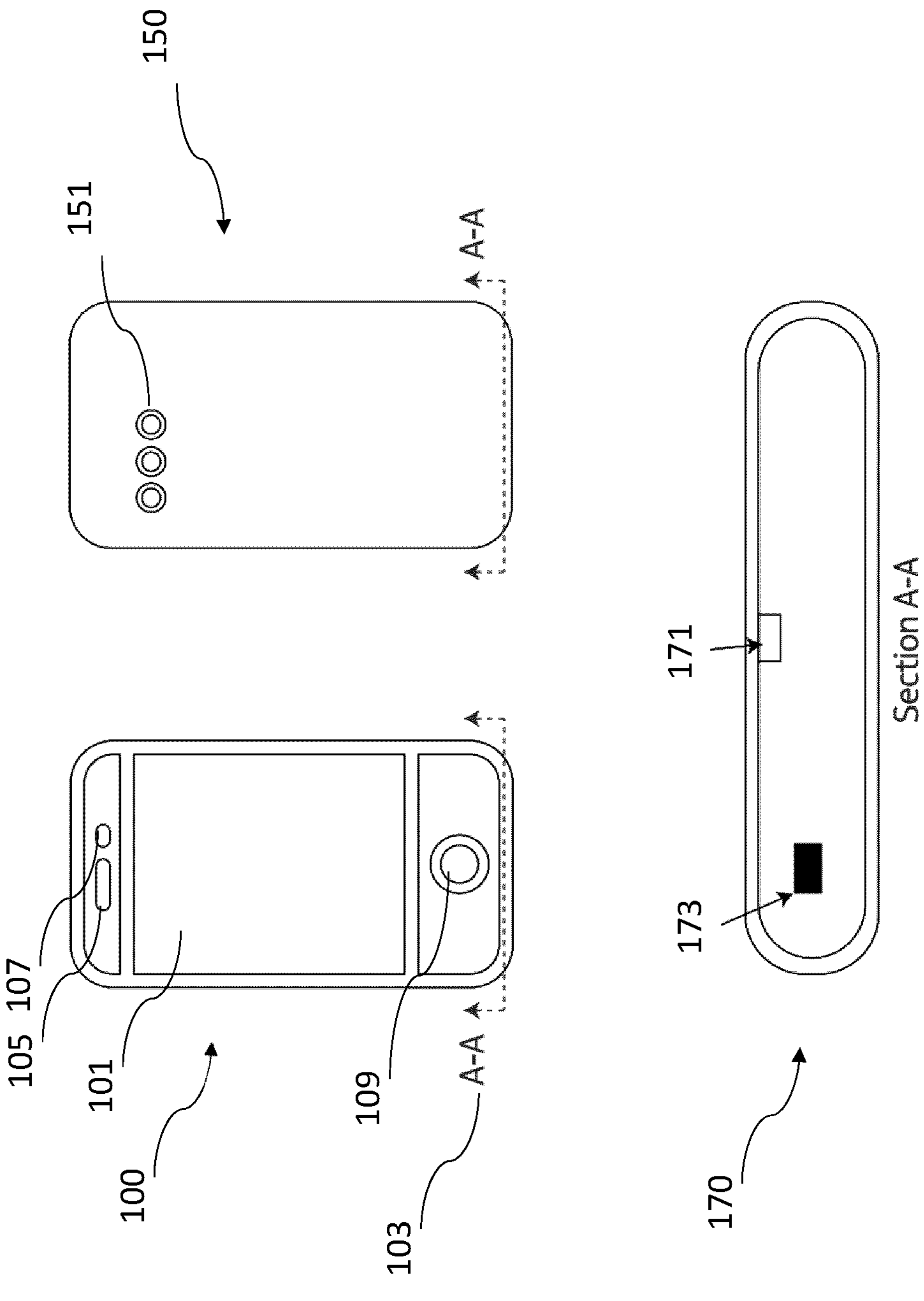
FIG. 1 shows schematically an example holeless mobile device suitable for implementing some embodiments.

With respect to FIG. 1 is shown an example holeless mobile device within which may be implemented a suitable solid state microphone. The mobile device in some embodiments may be a mobile phone of which is shown a front view 100, a rear view 150 and a cross-section view A-A 170. The front view for example shows the display 101, on which may be located a representation of an earpiece 105 and a representation of a front or selfie camera 107 and under which is located a suitable speaker transducer and camera arrangement. In the example shown in FIG. 1 the representation of an earpiece 105 can be any suitable earpiece implementation suitable for implementation in a sealed device. In some embodiments the earpiece or speaker component may be an implementation which requires at least one hole but is sealed in a suitable manner to prevent ingress to the other components or interior of the device. The representation of the front or selfie camera 107 can be any suitable camera implementation. For example in some embodiments the front or selfie camera 107 can be located behind a display element, a camera located behind a visible-light hole in the display or a pop-out camera implementation. Thus the front or selfie camera 107 may be a punch-hole or cut-out camera or a (motorized) pop-out camera implementation.

Furthermore is shown a microphone representation 109 under which an example microphone transducer may be located as discussed in further detail herein.

The front view furthermore shows the cross-sectional line A-A 103.

The rear view 150 shows the position of an example rear camera array 151. The rear camera array shown in FIG. 1 is an example only of a suitable rear or main camera arrangement. In some embodiments a device may comprise any suitable number or arrangement of cameras.

The cross-sectional view 170 shows the position of a solid-state microphone 171 which is in solid contact with the phone shell (or the interior of the case of the device). The solid state microphone, in some embodiments, comprises a graphene putty mixture (G-Putty) with a gain factor of around 600×. The gain factor of graphene putty is defined as the relative change in resistance for a given strain. This microphone is designed to operate in situations where there is no airflow path between the microphone and the surrounding environment, such as the holeless devices discussed above. When making a phone call, the user will hold section A-A 103 of the mobile phone close to their mouth and speak. The acoustic pressure waves generated by the voice of the user induces small vibrations (which may be generally known as acoustic waves or in some embodiments surface waves) through the shell of the phone which are detected by the microphone 171.

Furthermore in some embodiments the mobile phone comprises an inertial measurement unit (IMU) sensor 173 or vibration sensor. The IMU sensor 173 may be any suitable implementation. For example, in some embodiments the IMU sensor 173 is a micro-electromechanical system implementation. The IMU sensor 173 is configured to detect vibrations internal to the mobile device in order to filter out the effect of non-acoustic pressure waves such as extraneous vibrations through the phone shell. In some embodiments more than one IMUs can be used to measure vibrations in more than one location in the phone and/or in more than one axis in the phone. The electronic signal from the IMU sensor measurement can furthermore in some embodiments be used as a reference signal in a digital signal processing system to filter out any vibrational noise within the phone from the microphone signal generated by the microphone 171.

The microphone can thus comprise a casing which can be any suitable shape, for example cylindrical with one or more open faces. The microphone may furthermore comprise a cover located over at least one open face of the casing.

The microphone may furthermore comprise a composite material located within the casing and cover. The composite material may comprise a mixture or arrangement of a polymer and conductive particles. For example the polymer may be a viscoelastic polymer or any other material with similar mechanical dynamics. The conductive particles may be graphene, silver, copper or any similar material.

This composite material may be described as a putty. For example an arrangement or mixture of graphene and polymer may be called a graphene putty.

The composite material may be configured to alter an internal impedance based on a surface disturbance generated by a surface wave (or more generally an acoustic wave internal to the composite material) induced by an acoustic wave (external to the material). Furthermore in the arrangements shown herein the microphone apparatus is coupled via the cover to an interior side of a mobile phone or device and the surface wave is induced by the acoustic wave on an exterior side of the mobile phone. With respect to FIG. 2 is shown schematically an example of the microphone 171 shown in FIG. 1.

In the example microphone 171 the graphene putty 205 is protected by a wall 203, casing, container or other suitable solid material structure which is configured to surround the graphene putty 205 on the side (and underside). In the example shown the container is an open cylindrical shape, but it would be appreciated that the container may be any suitable shape. The wall 203, in some embodiments, has an opening at least on one side, which may be considered to be the top side or side which is in contact with the shell of the mobile phone. The graphene putty 205 may in some embodiments be covered by a membrane material 201 over this opening. This membrane material 201 is configured to protect the putty and furthermore may be configured to attempt to produce a mechanical impedance matching between the graphene putty 205 and the mobile phone shell material. The impedance matching may be designed to reduce the impedance mismatch between the graphene putty mixture and the harder material at the shell of the phone (e.g. glass, aluminium or polycarbonate). The membrane material may in some embodiments be a ceramic layer, a polymer layer or a metallic layer. The thickness and material choice can be dictated by the impedance matching requirements. Thus the membrane material 201 layer may be configured to have an acoustic impedance somewhere between that of the graphene putty and the shell of the phone to maximise vibroacoustic transmission into the putty, and increasing sensitivity.

Figure 3:
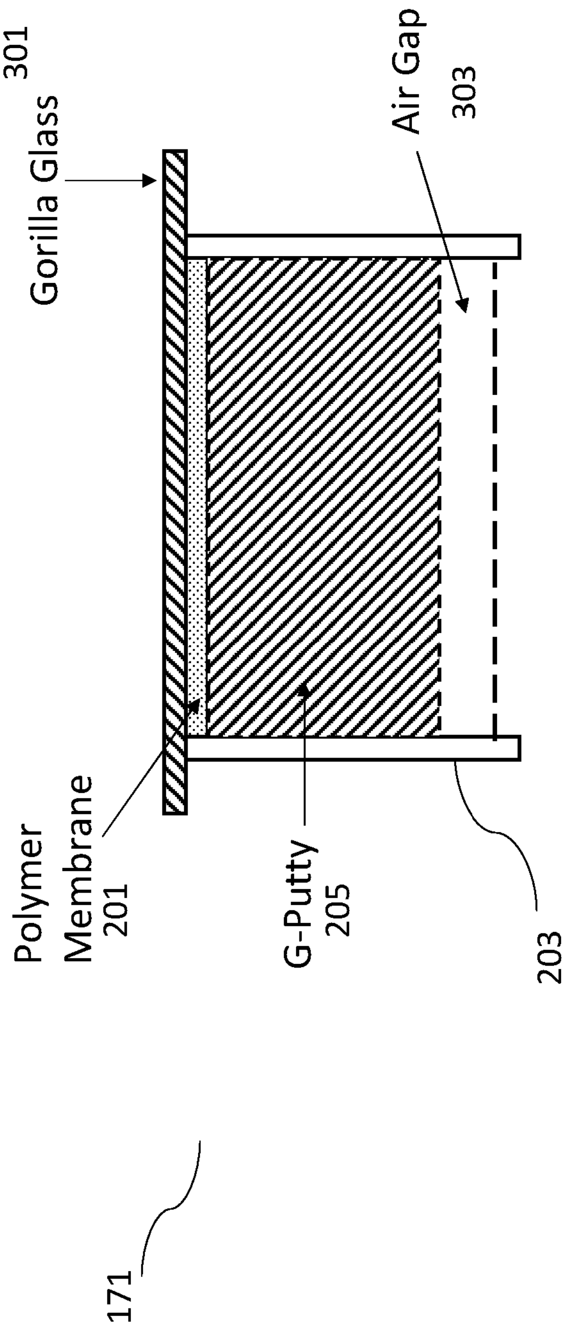
FIG. 3 shows a side view of the example microphone as shown in FIG. 2 according to some embodiments.

FIG. 3 shows schematically a sectioned side view of the microphone 171 when the microphone is in contact with a display or display assembly (or in some embodiments a suitable casing) of the mobile phone. In this example the microphone 171 is shown with the wall 203 surrounding the graphene putty (G-putty) 205 core. The graphene putty 205 is further shown in contact with the polymer membrane 201, which in turn is in contact with the gorilla glass 301 of the display (or other casing or shell interior). Furthermore is shown that underneath the graphene putty 205 and within the wall 203 is an air gap 303. The air gap 303 is configured to tune the frequency response of the microphone and as such may be designed based on the application of the microphone. In some embodiments there is no air gap.

Figure 2:
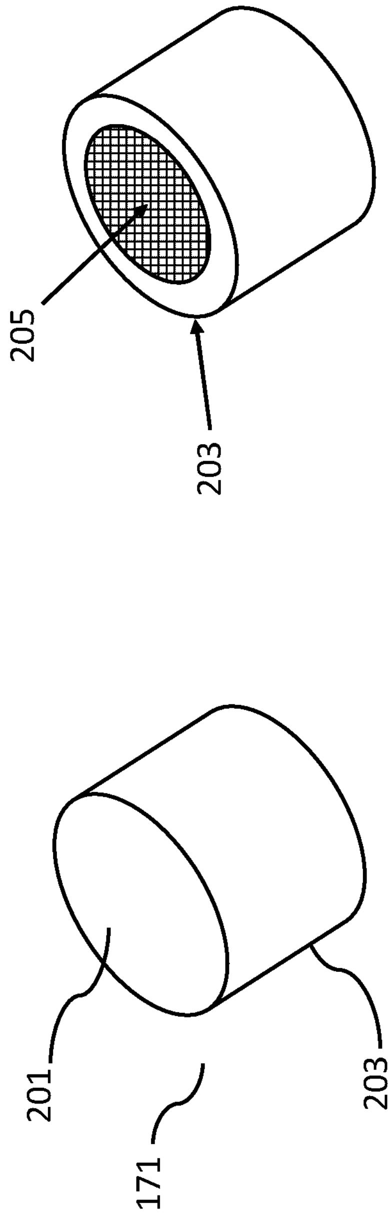
FIG. 2 shows schematically an example solid-state microphone suitable for employing with the device shown in FIG. 1 according to some embodiments.
Figure 4:
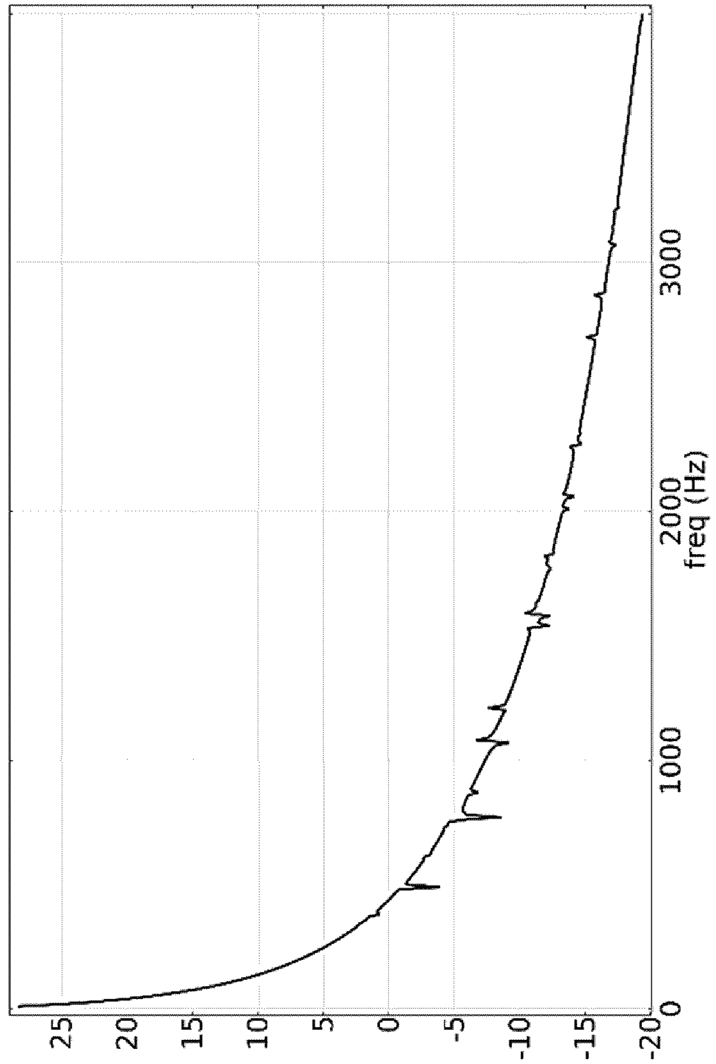
FIG. 4 shows resistance change for an example microphone as a function of frequency for a 0.1 Pa acoustic wave normally incident on the front surface of the mobile device.

In order to determine the efficacy of the putty microphone, a simulation using COMSOL Multiphysics was developed that captures the scenario shown in FIGS. 2 and 3. In these simulations a 0.1 Pa acoustic wave is normally-incident upon the front surface of the modelled mobile device. The mobile device is modelled as a 1 mm thick shell solid made of polycarbonate on all sides from the front face which is modelled as 1 mm glass. The microphone 171 is modelled as a solid cylinder with the material properties of silly putty and a 0.2 mm latex membrane separates the putty from the back of the display glass as shown in FIG. 4. The graphene putty itself is formed in a 4 mm diameter, 0.5 mm height cylinder which is fixed around its outer surface but is free to move along its longitudinal axis.

Figure 5:
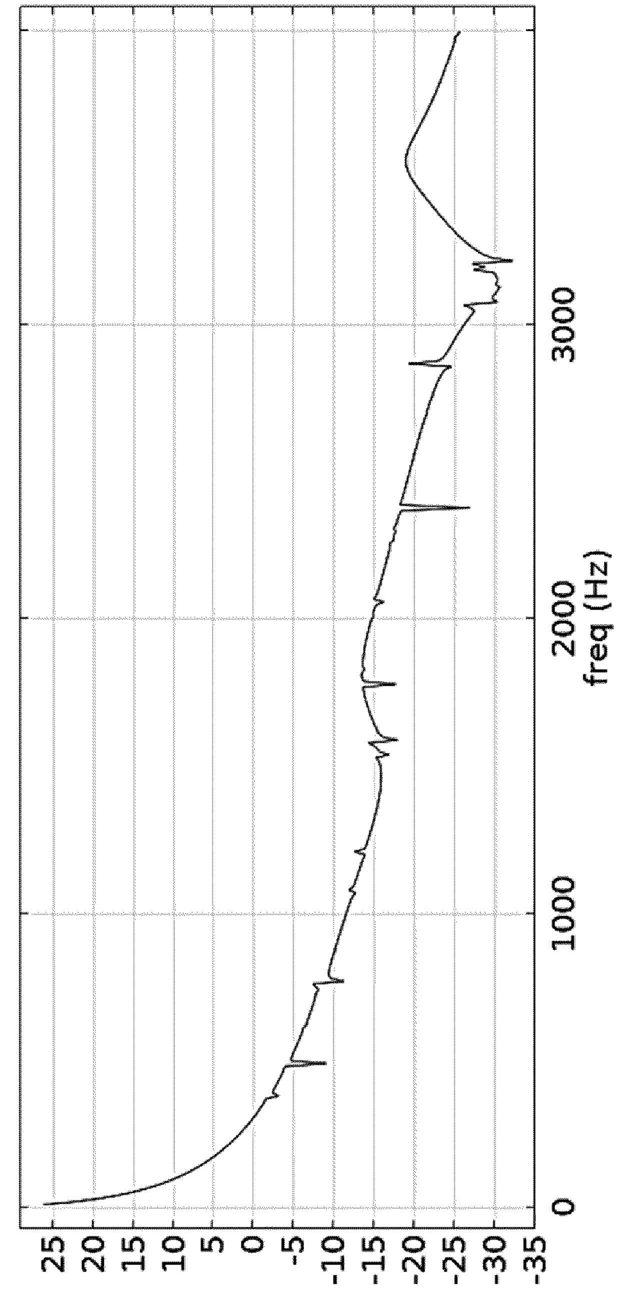
FIG. 5 shows resistance change for an example microphone as a function of frequency for a 0.1 Pa acoustic wave under parallel incidence on the front surface of the mobile device.

This simulation was run at a range of audible frequencies and the resulting resistance change that the G-Putty would exhibit is shown in FIGS. 4 and 5. The relative resistance change is predicted by examining the resultant strain that the putty cylinder exhibits in the simulations and scaling by the gain factor of G-Putty. The simulated scenario shows the effect of sound waves with amplitude 73.9 dB/0.1 Pa impacting the front surface of the mobile device (i.e. the glass face). This would be representative of human speech at a distance of around 0.4 m, depending on the volume of the speaker. This is therefore a representation of a hands-free application or video recordings at a moderate distance. Thus for example FIG. 4 shows a graph 401 of resistance change for an example microphone as a function of frequency for a 0.1 Pa acoustic wave normally incident on the front surface of the mobile device. FIG. 5 shows a graph 501 of resistance change for an example microphone as a function of frequency for a 0.1 Pa acoustic wave under parallel incidence on the front surface of the mobile device.

Figure 6:
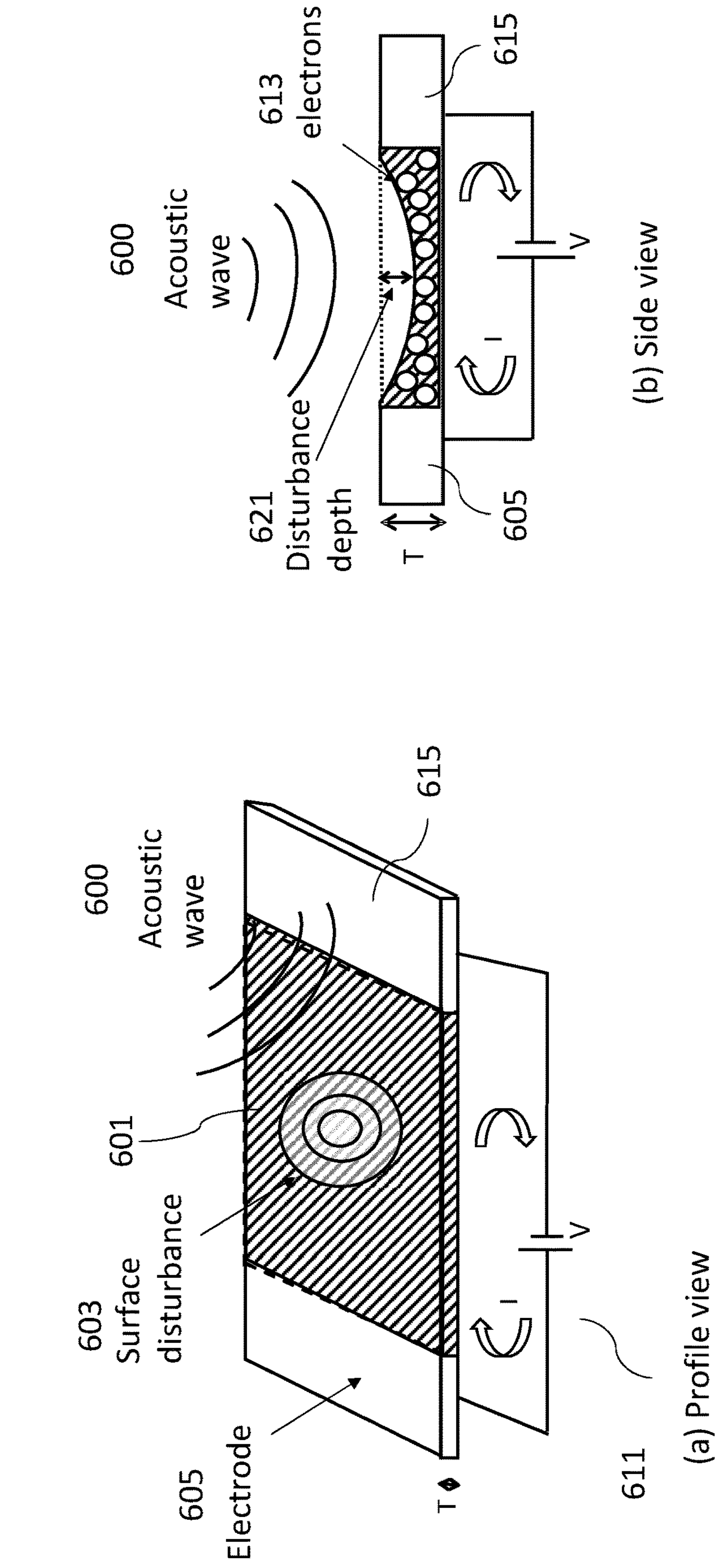
FIG. 6 shows a schematic view of an active layer, the graphene putty, within the example microphone as shown in FIGS. 2 and 3 according to some embodiments.

With respect to FIG. 6 is shown a profile and side view of the active layer of the example microphone 171 according to some embodiments. The example shows the graphene putty 601 layer which is coupled between two electrodes 605 and 615. The electrodes 613 are themselves coupled to a potential source 611. In other words the microphone 171 may be coupled via the electrodes to a suitable impedance determiner or impedance determination circuitry. The impedance determiner may be configured to generate electrical (audio) signals which are based on the surface waves and are induced by the acoustic wave. In other words there may comprise at least one audio signal generator configured to determine an audio signal based on the determined internal impedance of the at least one microphone. The mean free path for electrons to travel between the two electrodes 605 and 615 through the conductive putty is affected by any surface disturbance 603 induced by the acoustic wave 600 and furthermore the effective disturbance depth 621. The acoustic wave applies pressure to the surface of the putty and changes the geometry of the conductive path. Effectively the pressure wave compresses the conductive particles and this rearrangement changes the electrical resistance. The operation of g-putty is described in detail furthermore in "Sensitive electromechanical sensors using viscoelastic graphene-polymer nanocomposites" Conor S et al, Science 9 Dec. 2016: Vol. 354, Issue 6317, pp. 1257-1260 DOI:10.1126/science.aag2879.

As the resistance (impedance/frequency response) of the layer is relative to the mean free path of the electrons the impedance/frequency response of the layer is therefore affected by any surface disturbance.

Furthermore the dimensions of the graphene putty 601 layer affect the frequency response of the microphone and therefore the physical design of the graphene putty 601 layer can be chosen based on the desired impedance/frequency response of the microphone. However the physical dimensions are expected to typically be sub-millimetre in thickness. The cross-sectional dimensions of the microphone 171 itself will again affect the frequency response.

The resistance (impedance/frequency response) can in some embodiments be analysed by connecting the microphone 171 to a high-gain circuit with the microphone sensor forming one of the four resistors within a Wheatstone bridge configuration.

The expected directivity of the microphone is approximately super-cardioid, with enhanced sensitivity for sounds impinging on the microphone face and lower sensitivity in other directions. In the examples described sound waves normally-incident upon the glass face are measured with highest sensitivity and sounds from other directions measured with less sensitivity.

Figure 7:
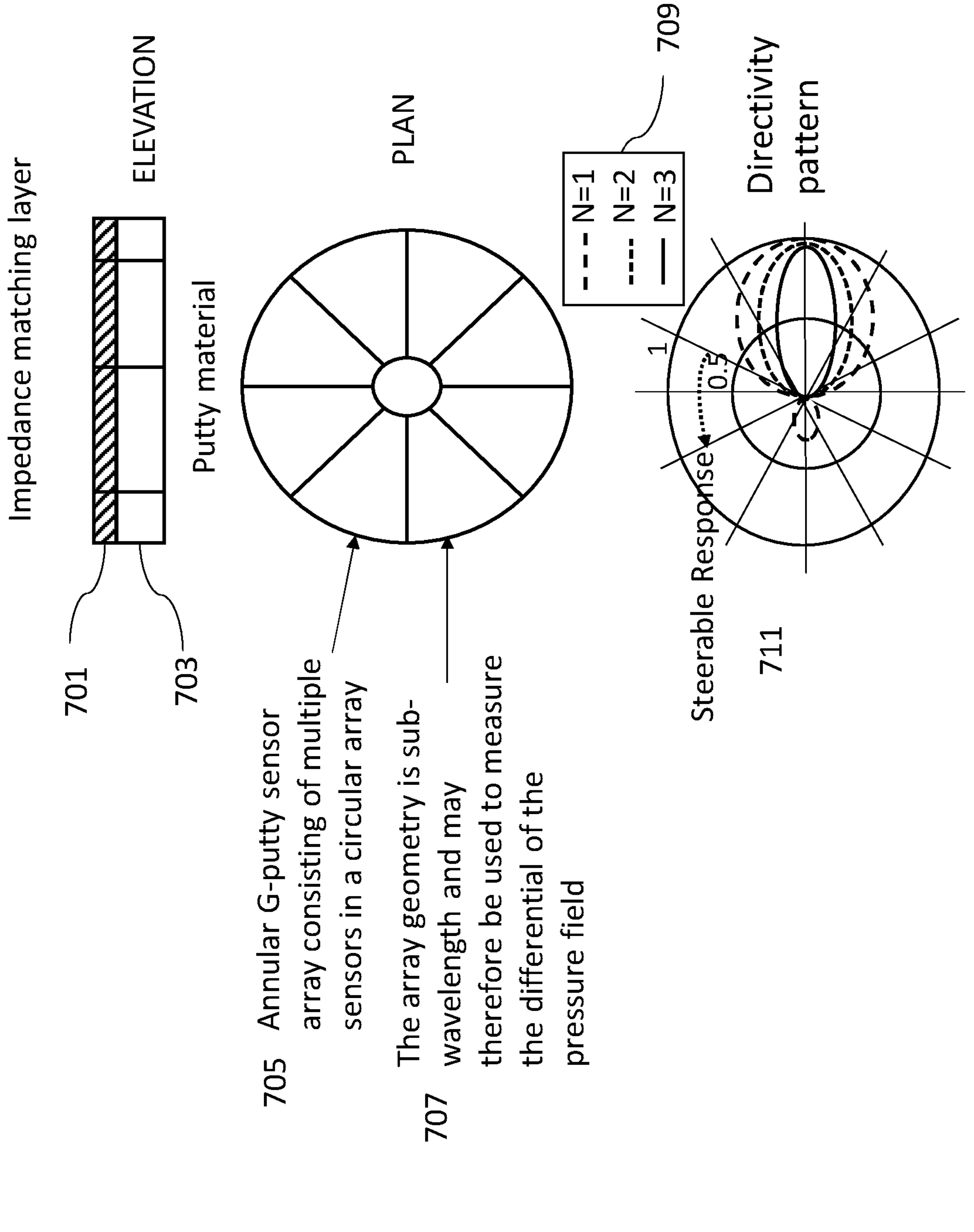
FIG. 7 shows a schematic view of an array of microphones according to some embodiments.

With respect to FIG. 7 is shown an example microphone array configuration of microphone sensors in a cylindrical package. In this example the microphone sensor 700 comprises 8 sector microphones 705 arranged in a circular array. Each microphone 705 comprises an impedance matching layer 701 and graphene putty layer 703. Although the example array configuration is one of sectors within a cylindrical package the array configuration of microphone sensors may be any suitable configuration, for example square or rectangular arrays or non-uniform arrangement sensor arrays. This dense array of putty microphones can be summarized as a single volume of graphene putty subdivided into multiple individual acoustic sensors that may be of millimetre dimensions. The inter-sensor spacing may also be of the order of millimetres. An array with such small (sub-wavelength) dimensions may be used as a differential sensor array. Such an array can be configured to be digitally steered to a desired direction, decreasing sensitivity in other directions. This may be used to adaptively steer the sensor array to further reject interfering sources of noise.

In some embodiments more than one microphone sensor can be employed as a sparse array of microphone sensors located around the inner shell (or casing) of the device. In such embodiments microphones from the sparse array could be switched on or off depending on the use case. For example a microphone closest to the user's mouth position at the lower side of the casing (glass face) could be used during a voice call and multiple microphones could be used to record audio in a video call use case.

In some embodiments the mobile device comprises both the example microphone as described herein and one or more traditional electret microphone with a crossover frequency. In such embodiments the conventional microphone could be used to detect or record low-frequency sounds below a defined or determined crossover frequency where the transmission loss in the conventional microphone is considered acceptable and the signal to noise ratio (SNR) is sufficient. Above this crossover frequency the signal from the microphone as discussed in the embodiments herein is used.

As the microphone as discussed in the embodiments herein is a solid-state device it furthermore may be robust to shock vibrations due to device drops.

From an industrial design standpoint, the microphones as discussed herein enables a holeless mobile device design possible by removing the need for microphones holes in the device and may enable a sleek, continuous device design. Furthermore sensor cost is not anticipated to be significantly different to a conventional electret or MEMS microphone, with only small volumes of graphene putty required.

Figure 8:
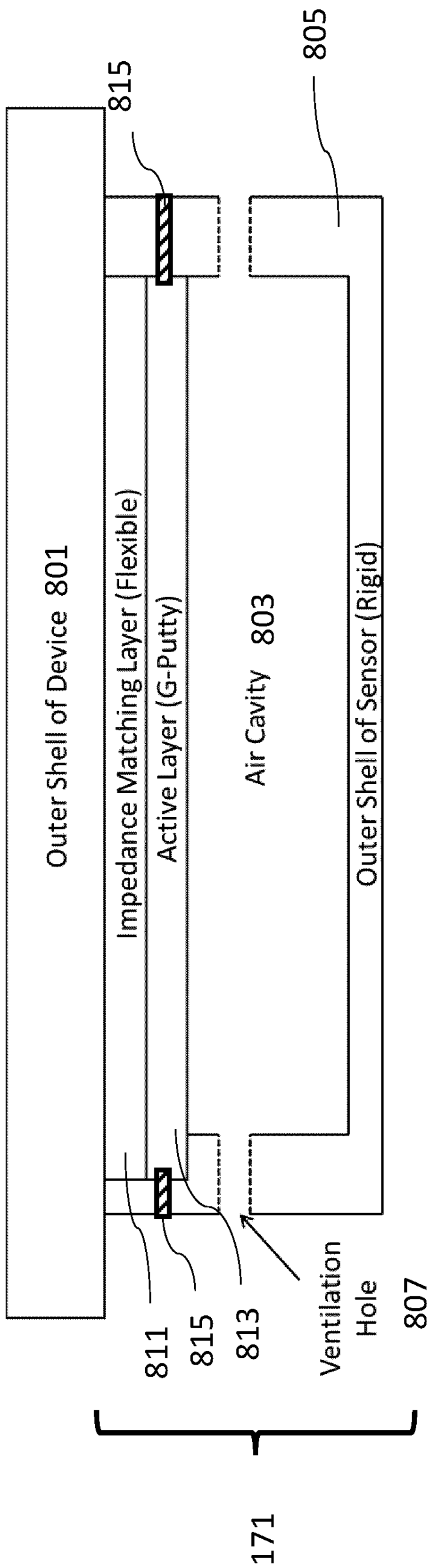
FIG. 8 shows a schematic view of an implementation of the microphone within a suitable device according to some embodiments.

An example implementation of the microphone sensor design employed within a mobile device is shown in FIG. 8. The microphone 171 sensor is built into the inner shell of a mobile device. The microphone 171 sensor could be attached to the outer shell 801 of the device by a suitable mechanical fastening or by adhesive to ensure good contact between the impedance matching layer 811 and the shell 801. The active layer 813 comprising the graphene putty below the impedance matching layer 811 is disturbed by the vibroacoustic transmissions from the outside environment through the outer shell 801 of the device.

Coupled to either side of the active layer, the graphene putty, 813 are electrodes 815 to enable the measurement of the impedance of the active layer 813.

The air cavity 803 below the active layer 813 as described above acts as a compliance (like a spring) to control/tune the response of the microphone sensor, as seen in a traditional electret sensor. The optional (internal) ventilation holes 807 also control the response of the microphone sensor by changing the air cavity response to a Helmholtz style resonance. The outer shell 805, wall or casing of the microphone is shown surrounding the impedance matching layer 811, the graphene active layer 813 and the air cavity 803. The optional (internal) ventilation holes 807 are shown through the outer shell 805 of the microphone.

Figure 9:
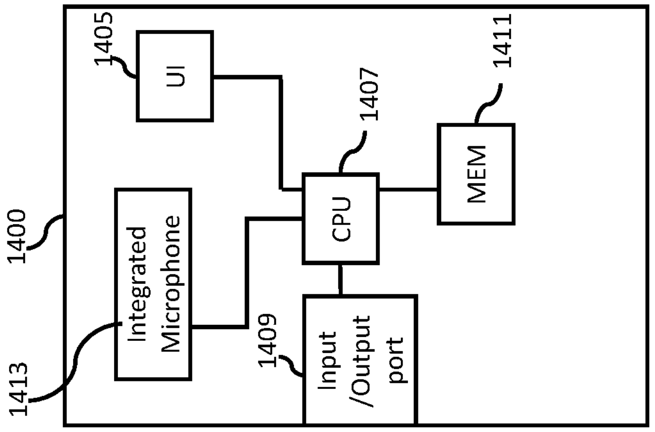
FIG. 9 shows an example device suitable for implementing the apparatus shown in previous figures.

With respect to FIG. 9 a schematic view of an example electronic device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as determining at least one audio signal based on the determined internal impedance of the microphone such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example audio signal data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to select a mode of operation which selects which microphone(s) or microphone element(s) are used to determine an audio signal or select the microphone(s) or microphone element(s) or to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable radio access architecture based on long term evolution advanced (LTE Advanced, LTE-A) or new radio (NR) (or can be referred to as 5G), universal mobile telecommunications system (UMTS) radio access network (UTRAN or E-UTRAN), long term evolution (LTE, the same as E-UTRA), 2G networks (legacy network technology), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS), any other suitable option and/or any combination thereof.

Furthermore is shown in FIG. 9 an integrated microphone 1413. The integrated microphone may comprise at least one microphone and associated impedance determination circuitry configured to generate an electrical signal which is based on the acoustic wave impacting the casing of the mobile device and may be coupled to the CPU 1407.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A microphone apparatus, comprising:

a casing; and a composite material located within the casing, the composite material comprising at least in part conductive particles, the composite material configured to alter an internal impedance based on a surface disturbance transmitted with an acoustic wave through the casing, and wherein the microphone apparatus is configured to be coupled to a surface that transmitted the acoustic wave.

2. The microphone apparatus as claimed in claim 1, wherein the casing is configured to form an air gap underlying the composite material, the air gap configured to acoustically tune the microphone apparatus.

3. The microphone apparatus as claimed in claim 1, further comprising a cover located over at least one open face of the casing and in contact with the composite material and an interior side of a further apparatus.

4. The microphone apparatus as claimed in claim 3, wherein the cover comprises a membrane layer overlying the composite material.

5. The microphone apparatus as claimed in claim 3, wherein the cover is configured to mechanically protect the composite material.

6. The microphone apparatus as claimed in claim 3, wherein the cover is configured to provide acoustic wave impedance matching.

7. The microphone apparatus as claimed in claim 1, wherein the casing is configured to surround and support the composite material.

8. The microphone apparatus as claimed in claim 1, wherein the casing comprises a hole configured to acoustically tune the microphone apparatus.

9. The microphone apparatus as claimed in claim 1, further comprising at least one pair of electrodes coupled to the composite material, wherein the at least one pair of electrodes are configured to enable the internal impedance to be determined.

10. The microphone apparatus as claimed in claim 1, wherein the composite material comprises at least two elements arranged in a defined configuration, wherein the at least two elements comprise an associated internal impedance.

11. The microphone apparatus as claimed in claim 1, wherein the conductive particles comprise at least one of:

graphene;

silver; or copper.

12. The microphone apparatus as claimed in claim 1, wherein the composite material further comprises a viscoelastic polymer.

13. The microphone apparatus as claimed in claim 1, wherein the composite material has a relative change in impedance for a defined strain change value in the range 500 to 700.

14. A mobile device comprising:

at least one microphone apparatus as claimed in claim 1;

at least one further apparatus comprising a casing on which the at least one microphone apparatus is coupled to an interior side thereof; and at least one audio signal generator configured to determine an audio signal based on the internal impedance, wherein the further apparatus is a second mobile device.

15. The mobile device as claimed in claim 14, further comprising at least one inertial measurement sensor or vibration sensor configured to determine at least one vibration internal to the mobile device, wherein the at least one audio signal generator is further configured to determine the audio signal based on the at least one vibration internal to the mobile device.

16. The mobile device as claimed in claim 14, wherein the at least one audio signal generator is further configured to determine the audio signal based on a processing of a first internal impedance associated with a first of the at least two elements and a second internal impedance associated with a second of the at least two elements, such that the processing is configured to selectively beamform the audio signal.

17. The mobile device as claimed in claim 14, wherein the at least one microphone apparatus comprises two or more physically separate microphone apparatuses, wherein the at least one audio signal generator is further configured to determine the audio signal based on a selection or processing of the internal impedance associated with a first of the two or more physically separate microphone apparatuses and the internal impedance associated with a second of the two or more physically separate microphone apparatuses.

18. The mobile device as claimed in claim 14, wherein the further apparatus casing on which the at least one microphone apparatus is coupled to the interior side thereof is a display or display assembly.

19. The mobile device as claimed in claim 14, wherein the composite material comprises at least two elements arranged in a defined configuration.

20. A method for a microphone apparatus comprising:

providing a casing; and providing a composite material located within the casing, the composite material comprising at least in part conductive particles, the composite material configured to alter an internal impedance based on a surface disturbance transmitted with an acoustic wave through the casing, and wherein the microphone apparatus is configured to be coupled to a surface that transmitted the acoustic wave.

* * * * *